United States Patent
Wheeler

[15] 3,661,688
[45] May 9, 1972

[54] COMPOSITE BOARD LAMINATE

[72] Inventor: Robert G. Wheeler, Corvallis, Oreg.
[73] Assignee: Wood Process, Oregon Ltd., Corvallis, Oreg.
[22] Filed: Feb. 18, 1970
[21] Appl. No.: 12,356

[52] U.S. Cl. ..............................161/37, 144/313, 144/320, 144/328, 156/220, 161/43, 161/44, 161/118, 161/120, 161/121, 161/123, 161/124, 161/149, 161/156, 161/162, 161/168, 161/166, 264/119, 264/293
[51] Int. Cl. .........................................B32b 3/02, B32b 3/30
[58] Field of Search ..............264/119, 293; 156/220; 161/37, 161/43, 44, 118, 120, 121, 123, 124, 149, 166, 156, 162, 158, 168, 170; 52/581, 588, 589, 590; 144/320, 328, 313

[56] References Cited

UNITED STATES PATENTS 1,790,178  1/1931  Sutherland ........................161/44 UX
2,682,083  6/1954  Patton ..................................264/119

Primary Examiner—William A. Powell
Attorney—Elmer A. Buxkhorn

[57] ABSTRACT

A composite board product according to the present invention is formed from a core of coarse wood components disposed between a pair of cellulosic fiber webs. This assembly is compressed to consolidate the board product and to provide an indented margin thereupon. The board product is provided with a rounded shoulder where the margin joins the rest of the product in order to preserve the continuity of the tough skin formed by a cellulosic fiber web. The margin edge is preferably rounded off on the side of the board product opposite the indented margin, and the tough skin formed by the remaining cellulosic fiber web is folded over. After trimming, only a narrow edge of doubly densified wooden core is exposed to the weather.

9 Claims, 6 Drawing Figures

Patented May 9, 1972

3,661,688

ROBERT G. WHEELER
INVENTOR

BY
BUCKHORN, BLORE, KLARQUIST & SPARKMAN
ATTORNEYS

COMPOSITE BOARD LAMINATE

BACKGROUND OF THE INVENTION

Advantageous composite board products constructed in accordance with U.S. Pat. Nos. 2,992,152; 2,947,654; and 3,011,938, granted to Ralph Chapman, comprise an inner core of coarse wood particles disposed between tough cellulosic fiber skins. In each instance, the assembly is compacted and consolidated in such a manner as to result in a strong and rigid medium density board. By suitable selection of the ingredients used in preparation of the wood particles and of the webs forming the surface skins, the boards can be made suitable for exterior use.

However, exposure of the interior core of consolidated wooden components to the elements is generally undesirable, since the core is liable to absorb moisture, freeze, and deteriorate generally. Accordingly, medium density board products of the above mentioned type are commonly employed as vertical exterior panels disposed in edge abutting relation with wooden or metal batten strips covering and protecting the butt joints. Longitudinal grooves may be provided adjacent the panel edges, and aluminum batten strips suitably engage a pair of grooves on adjacent panels for covering the butt joint therebetween. Of course, the batten strips add to the cost of construction, and are sometimes not desired from the standpoint of appearance of the resulting wall.

SUMMARY OF THE INVENTION

According to the present invention, a composite board product is provided from a core of coarse wooden components disposed between a pair of cellulosic fiber webs, the assembly being compressed to consolidate the wooden components and to transform the webs into dense outer skins. The board product is formed with opposite marginal portions of reduced thickness adapted to overlap adjacent similar boards in a ship-lapped relationship. Accordingly, a margin of the composite board product is additionally compressed and indented from one side to a second and smaller thickness producing additional densification of such margin. The margin starts with a rounded shoulder to prevent a break in the web. The margin outer edge is also preferably rounded off from the opposite side of the board product, with the outer skin folding over the edge corner. There remains a narrow edge portion which is trimmed away in line with the rounded corner so that the core of the board product is exposed, but the exposed area is doubly densified so that it takes on the characteristics of a hardboard whereby exposure thereof does not subject the board product to weather deterioration. As a consequence, no batten strips are needed.

The aforementioned margin of the board product is desirably indented to substantially one-half the board thickness from one side thereof while the edge of said margin is rounded off from the opposite side of the board product. The resulting configuration is desirably duplicated with reverse orientation at each side of the board product for providing wall panels which can be readily ship-lapped at the margins. The panels may also be provided with longitudinal grooves parallel to and between the lap joints for resulting in an attractive overall pattern.

According to apparatus aspects of the present invention, the composite board product is completed between press caul plates, one of which is provided with a metal insert which is adapted to compress the board product margin for indenting the same. In addition, a second insert upraised from the surface of the opposite caul plate curves tangentially away from the latter surface toward an edge opposite the first mentioned insert. The second insert acts to fold over the cellulosic skin of the board product while additionally densifying the board product's core between the two inserts.

It is an object of the present invention to provide an improved composite board product which is adaptable to exterior wall construction.

It is a further object of the present invention to provide an improved composite medium density board product having margins suitable for ship-lap type construction and provided with edges substantially protected from weather disintegration.

It is another object of the present invention to provide an improved composite board product suitable for disposition as exterior wall panels in a sturdy, overall wall construction without requiring the addition of batten strips to protect the joints between panels.

It is a further object of the present invention to provide a process for forming an improved composite board product adapted for exterior use.

It is an additional object of the present invention to provide an apparatus for manufacturing an improved composite board product suitable for exterior construction.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
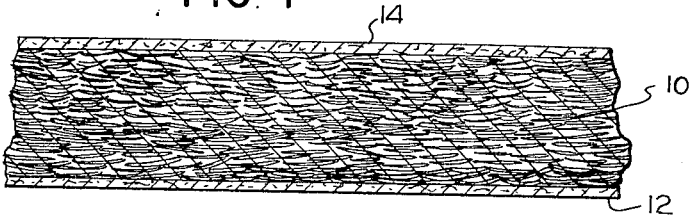
FIG. 1 is a cross-sectional view, partially broken away, of an assembly of coarse wood components between cellulosic fiber webs, from which a composite board product according to the present invention is manufactured.

Referring to FIG. 1, the composite board product according to the present invention is formed from an assembly or sandwich comprising a core 10 of fairly coarse wood particles between two wet blankets or webs 12 and 14 consisting of interlaced cellulosic fibers. The wood particles may comprise wood waste material such as planer shavings, veneer flakes, or the like, and are mixed with a suitable adhesive such as phenolic resin. The wood particles are dried, e.g. having a moisture content of about 8 to 15 percent. The wood particles may be deposited to a depth of about 4 inches for subsequently resulting in a ¾-inch board product. The adhesive must be one which sets or cures after having been subjected to heat and pressure in the presence of steam, and must be one which will not be excessively absorbed into the wood particles. The webs 12 and 14 are each typically on the order of one-thirty-second to one-sixteenth inch in thickness, and are preferably cellulosic pulp such as wood pulp. In preparing each web, a slurry is prepared of the proper consistency for suction formation, and the web may be formed on a suction head or cylinder having a pulp screen of the desired size. The resulting web is about 50 percent water. The assembly illustrated in FIG. 1 may be formed by laying down a first web 12 of cellulosic fibers, depositing the wood particles thereupon, and completing the assembly with the second web 14. The assembly of FIG. 1 is suitably formed into a rigid board product employing the press illustrated in FIG. 2.

Figure 2:
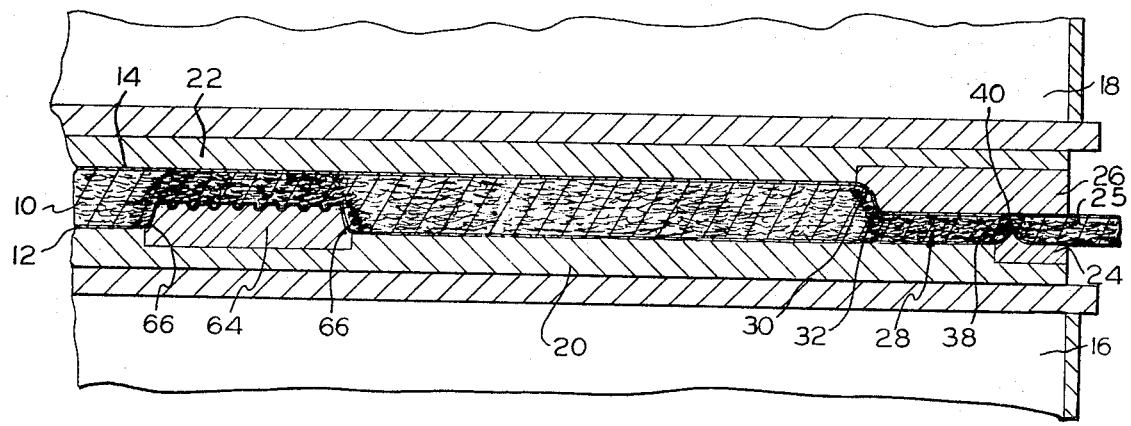
FIG. 2 is a side view, partially broken away, of a portion of a press employed in forming a composite board product in accordance with the present invention, with such board product being shown in cross section between press platens.

Referring to FIG. 2, a press apparatus comprises a pair of parallel platens 16 and 18 which are each hollow for introduction of a hot gas such as hot air or steam for heating the assembly of wood particles and cellulosic fiber webs, placed between the platens, to an elevated temperature. Such temperature should be higher than the boiling point of water whereby steam will form from the moisture in core 10 of the assembly. However, such temperature should be below the charring point of paper in order that webs 12 and 14 will not become charred. The temperature is desirably between 275° and 325° F.

Between the press platens are metal caul plates 20 and 22 which themselves actually contact the composite board assembly therebetween, the upper plate 22 being secured to the upper press platen by means not shown. The upper caul plate 22 may be omitted, if desired. The sandwich of FIG. 1 is initially assembled upon the lower caul plate 20 prior to the insertion of the same into the press. Suitable metals for the caul plates are mild steel or aluminum.

The assembly 10, 12, 14 is compressed between the press platens at a pressure suitably between 30 and 75 p.s.i. for a period typically between about 1 and 1½ hours, depending upon moisture content and the like. The heat from the platens transforms the moisture in the wood and webs into steam which escapes through the interstices between the wood particles. After several minutes of moist heat, the wood particles are softened sufficiently that the fibers thereof will slip with respect to one another under pressure, permitting the mass to settle to the desired thickness. Most of the action involving softening of the particles, adjustment of the particles into close conformity with one another, relieving stresses in the core, and curing most of the adhesive, is accomplished in about 20 to 30 minutes. The remaining time that the assembly remains in the press is desirable to drive out almost all the moisture and reduce the resulting board to a substantially bone-dry state, say, for example, 2 to 3 percent moisture content, to completely cure all the adhesive throughout the board, and to drive all of the steam out so that when pressure is released, surfaces of the board will now blow apart. Spacer jibs or blocks (not shown) may be further disposed at the edges of the press platens for blocking the platens apart when the desired final thickness for the composite board product is reached.

The assembly 10, 12, 14 is reduced to a thickness of between ½ and 1 inch as a result of the heat and pressure applied, usually having a density in the order of 0.5 to 0.7, with dense, tough skins of compacted cellulosic fibers resulting from the webs 12 and 14 on either side of the core of consolidated wood particles. These skins of cellulosic fibers are interlocked with the irregular surfaces of the core 10 formed by the particles. The density of the board product, except for specific portions thereof to be described hereinafter, is such that it may be characterized as medium density board.

The method of making the composite board product as thus far described is similar to those set forth in U.S. Pat. Nos. 2,992,152; 2,947,654; and 3,011,938, granted to Ralph Chapman. The press comprising platens 16 and 18 may comprise a standard hot press, or more advantageously, a stack press as set forth in U.S. Pat. No. 3,061,878, also granted to Ralph Chapman. The lower caul plate 20 may have a textured surface pattern as illustrated in my U.S. Design Pat. No. D213,493, the process of making such caul plates being further set forth in my U.S. Pat. No. 3,474,706. The aforementioned patents are all assigned to the assignee of the present invention.

According to the present invention, the press illustrated in FIG. 2 is further provided with lower and upper inserts 24 and 26 secured to the lower and upper caul plates respectively by conventional means (not shown). If the upper caul plate 22 is omitted, the insert 26 will be suitably secured directly to the edge portion of the lower surface of the upper platen 18. Inserts 24 and 26 are suitably formed of the same metal as the unit to which they may be attached. Upper insert 26 defines a right-hand margin 28 for the board product. Insert 26 is raised away from the surface on which it is mounted such that the margin 28 of the board product is compressed to about 50 percent of the thickness of the board disposed only between opposed caul plates. The upper insert 26 thus exerts pressure from a first side of the board product indenting the margin 28 while further densifying the wood particles within the core of margin 28. The insert is gently contoured or rounded at 30 for similarly contouring the resulting board product 21 to produce a section of gradually changing thickness, e.g. a round or rounded shoulder at 34, to prevent severing or tearing the upper skin 14' of the product. The radius of curvature of the rounded shoulder is approximately 50 percent of the thickness of the board product. The curvature of the fillet 36, as produced by rounded contour 32 of insert 26, is of less importance because the skin is not stretched in this region. However, a rounded contour is desirable here also. Thus the tough skin formed from cellulosic fiber is gently folded or rolled over at 34 and 36, and no break or tear is produced in the skin. The core is progressively densified toward margin 28.

Lower insert 24 is also contoured or curved at 38 tangentially away from the surface of lower caul plate 20 and perpendicularly toward the lower surface of insert 26, the lower insert 24 ending in an edge 40 directly opposite the upper insert. The radius of curvature of the insert 24 is here again at least comparable to 50 percent of the board product thickness. Preferably, the edge 40 terminates at about 50 percent of the thickness of the marginal portion 28. The final spacing of the press platens is suitably controlled by the interposition of blocks or jibs, as hereinbefore described. The edge portion 25 of the board to the right of the edge 40 may later be trimmed away with a saw.

Figure 3:
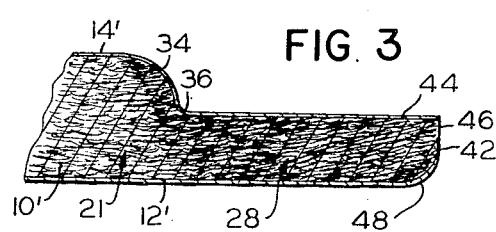
FIG. 3 is a cross-sectional view to an enlarged scale of a margin of a board product in accordance with the present invention.

When the press platens are brought together, the lower insert 24 rounds off or contours the right-hand edge corner of the board product from the lower side thereof, i.e. at 48 in FIG. 3, further densifying the board product at this point and particularly between point 42 and upper surface 44. The lower skin 12' (formed from web 12) is folded or rolled over by action of insert 24 substantially to point 42 spaced from the upper surface 44 of the margin. The fold will extend for at least about 50 percent of the thickness of margin 28, generally according to the height of edge 40. Thus, the skin 12' is retained for some distance where the right-hand edge of the board product curves away from its lower surface, thereby protecting the core up to point 42. A narrow exposed edge portion 46 is left where the skin 12' stops. However, insert 24 compresses the board product to a progressively greater extent as it curves around toward insert 26. Thus, at exposed edge 46, the upper edge 40 of insert 24 will be closely spaced to insert 26. The core of the board product is therefore so densified at exposed edge 46 as to take on the characteristics of a hardboard product at that point. The edge 46 is thus doubly densified by both inserts 24 and 26 and will be substantially impervious to moisture and the like. This is, of course, particularly true when the core 10 contains a suitable amount of phenolic resin material or an equivalent thereof.

Figure 4:
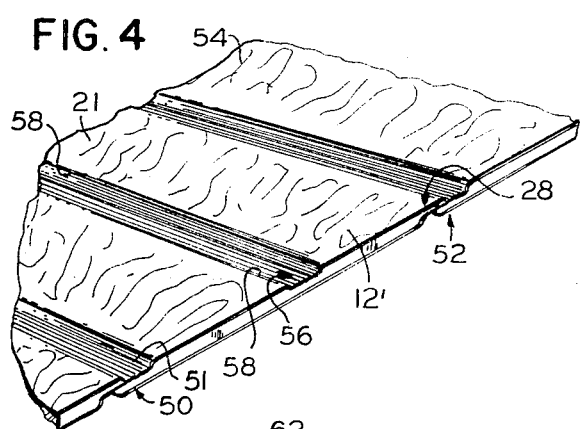
FIG. 4 is a fragmentary perspective view of board products in accordance with the present invention, lapped to provide an extended surface.

Although not shown in FIG. 2, it is understood that inserts similar to inserts 24 and 26 may, if desired, be provided at the opposite or left-hand side of the press (not shown) with the latter inserts being vertically reversed whereby a left-hand margin will extend from the upper side of the board making possible a ship-lapped construction. An assembly of completed board products is illustrated in FIG. 4 having a first margin 28 and a second similar but oppositely disposed margin 50. Since the margin 50 will ordinarily not be exposed to the weather, the edge thereof may be trimmed, such as by sawing, instead of being densified and shielded as described above with respect to the margin 28. The surface of the skin 12' of the FIG. 4 board product has been textured as illustrated in my U.S. Design Pat. No. D213,493 by a caul plate 20 produced according to my aforementioned U.S. Pat. No.

3,474,706. In a multi-panel construction, margin 28 is suitably lapped with margin 52 of a second and similar board product 54 to provide a sturdy and weatherproof overall construction, which, of course, may be completed by conventional fastener devices (not shown) for securing the board panels to supporting structure. An overlapped board assembly is further illustrated in cross section in FIG. 5.

Figures 5, 6:
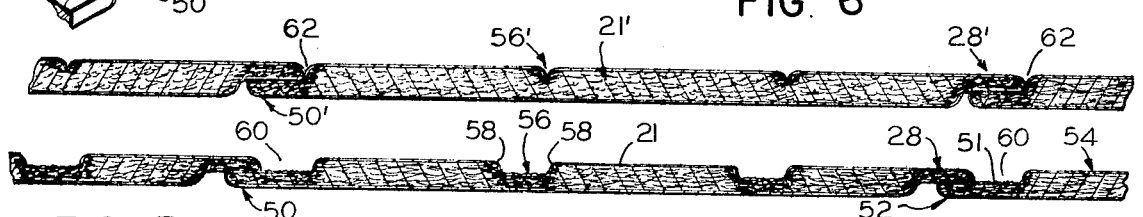
FIG. 5 is a cross-sectional view of a wall employing board products according to the present invention, said wall having a first exterior design.
FIG. 6 is a cross-sectional view of a wall employing board products according to the present invention, said wall having a second exterior design.

The board product 21 may be provided with one or more grooves or channels 56 parallel to the edge margins 28 and 50. These grooves or channels extend into the board product 21 to a depth of approximately 50 percent of the board thickness, and have side wall edges or shoulders 58 which are gently curved for maintaining the integrity of skin 12'. These grooves or channels may be relatively wide as illustrated at 56' in FIG. 6, and have the general purpose of completing an overall decorative pattern. The grooves or channels will be vertically disposed on an outside building wall, the grooves or channels presenting the same surface appearance as lapped joints formed, for example, by margins 28 and 52. In the case of the wider channels 56, the channel bottoms are suitably provided with shallow multiple striations or embossed ridges extending longitudinally of the channel. In this instance, similar striations or ridges may be provided upon the outwardly facing compressed surfaces 51 of margins 50 and 52. The degree of lapping may be then adjusted as illustrated in FIG. 5 so as to provide a channel appearance at 60 similar to that provided by channel 56. On the other hand, the wall construction as illustrated in FIG. 6 suitably overlaps the composite board margins to the full extent thereby completing grooves 62 having the same appearance as narrow grooves 56'.

Returning to FIG. 2, means are illustrated for forming the wider grooves 56 in the composite board product. An additional insert 64 is secured to the lower caul plate 20. The insert 64 extends along the caul plate 20 substantially parallel to the board product edge margins hereinbefore described. This insert, suitably formed from the same metal as the caul plate, extends upwardly from the lower caul plate and is provided on its upper surface with an embossed pattern for producing striations or embossed ridges in the composite board product when such product is compressed. The edges or shoulders 66 of insert 64 are gently rounded to provide the rounded shoulders 58 in the board product while preventing shearing of the paper skin by the insert 64. The action is substantially the same as in the production of margin 28.

There is thus formed according to the present invention a composite board product adaptable to exterior wall construction which does not require protective batten strips or the like between board panels. Board margins are compressed by approximately 50 percent for overlapping, but the margins are indented in a smoothly curved manner to prevent severing of the outer skin. Decorative grooves or channels are similarly protected rather than being merely routed out. Although a small edge 46 of the wooden core material will be exposed at the outside of the wall in the case of each of the composite board products, since this area is highly or doubly compressed and takes on the characteristics of hardboard, no damaging weathering will take place in this region. Moreover, the skin formed from the cellulosic outer web is folded over into the groove formed by lapping to the point where the highest degree of edge densification has been produced, such skin being tough and weatherproof. The overall wall construction secured is advantageously sturdy, weatherproof, and attractive in appearance.

While I have shown and described preferred embodiments of my invention, it will be apparent to those skilled in the art that many changes and modifications may be made without departing from my invention in its broader aspects. I therefore intend the appended claims to cover all such changes and modifications as fall within the true scope and spirit of my invention.

I claim:

1. A composite board product comprising:
   a core of consolidated and adhered coarse wooden components between a pair of densified parallel outer skins of cellulosic fibers firmly bonded to said core, said composite board product having a first general thickness between said parallel outer skins, and having at least one portion which is additionally densified and indented, with said outer skin extending to the indented level of said portion,
   the surface of said indented portion joining the remainder of said board product by at least one section of gradually changing thickness providing a rounded shoulder contour and having one of said skins rolled thereover in bonded relation to said core, said skin being free of breaks for protecting said core where said portion merges with the remainder of said board product.

2. The board product according to claim 1 wherein said portion has a thickness of about 50 percent of the thickness of the major portion of said board product.

3. In combination with the board product of claim 1, wherein said portion comprises an edge margin of said board product, a similar board product having a similar but reversely directed margin on its opposite edge, said reversely directed margin engaging the margin of the first mentioned board product in overlapped relation.

4. The board product according to claim 1 wherein said portion comprises a margin of said board product, said margin having an outer edge rounded off with one of said skins extending part way around said outer edge in bonded relation to the core, leaving a further densified core portion exposed.

5. A composite board product comprising:
   a core of consolidated and adhered coarse wooden components between a pair of densified parallel outer skins of cellulosic fibers firmly bonded to said core, said composite board product having a first general thickness between said parallel outer skins, and having at least one margin which is additionally densified and indented, with said outer skin extending to the indented level of said margin,
   said margin having an outer edge rounded off with one of said skins extending part way around said outer edge in bonded relation to the core, leaving a further densified core portion exposed.

6. A composite board product comprising:
   a core of consolidated and adhered coarse wooden components between a pair of densified parallel outer skins of cellulosic fibers firmly bonded to said core, said composite board product having a first general thickness between said parallel outer skins, and having at least one margin which is additionally densified and indented below a first side of said composite board product with said outer skin extending to the indented level of said margin on said first side,
   said margin having an outer edge rounded off from the opposite side of said composite board product around which said skin from said opposite side extends to at least about 50 percent of the thickness of said margin, leaving a further densified core portion exposed.

7. The composite board product according to claim 6 having a similar margin but reversely directed on an opposite edge of said composite board product parallel to said first margin.

8. In combination with the board product of claim 6, a similar board product having a similar but reversely directed margin on its opposite edge, said reversely directed margin engaging the margin of the first mentioned board product in overlapped relation.

9. The composite board product according to claim 6 further including one or more indented grooves substantially parallel to said first and second margins and disposed in order between said first and second margins, said grooves having rounded sidewalls substantially corresponding to said rounded edge of said margin but wherein said skin remains unbroken across each of said grooves, said grooves providing an overall pattern similar to the grooved appearance produced with a said margin lapped with respect to a similar but reversed margin of a second such composite board product.

* * * * *